United States Patent
Saller et al.

(10) Patent No.: US 7,142,966 B2
(45) Date of Patent: Nov. 28, 2006

(54) APPARATUS AND METHOD FOR THE VARIABLE RATE APPLICATION OF SUBSTANCES TO LAND

(75) Inventors: Michael Saller, Moosbach (DE); Thomas Bock, Martoberdorf (DE)

(73) Assignee: AGCO GmbH & Co. (DE)

( * ) Notice: Subject to any disclaimer, the term of this patent is extended or adjusted under 35 U.S.C. 154(b) by 0 days.

(21) Appl. No.: 10/176,393

(22) Filed: Jun. 20, 2002

(65) Prior Publication Data

US 2003/0018423 A1 Jan. 23, 2003

(30) Foreign Application Priority Data

Jun. 27, 2001 (GB) .................... 0115672.8

(51) Int. Cl.
*G06F 19/00* (2006.01)
*B05B 9/06* (2006.01)

(52) U.S. Cl. ........................... 701/50; 239/156

(58) Field of Classification Search ............. 701/50, 701/70, 79, 110; 172/48, 58–60; 329/146–147, 329/155–160, 170, 172–176, 71, 73–74; 239/156

See application file for complete search history.

(56) References Cited

U.S. PATENT DOCUMENTS 3,693,890 A * 9/1972 Torrey .................. 239/668
4,817,870 A * 4/1989 Dalton ................. 239/157
5,485,161 A 1/1996 Vaughn
5,526,261 A * 6/1996 Kallis et al. ............ 701/51
5,549,089 A * 8/1996 Snell et al. ............ 123/352
5,754,137 A 5/1998 Durrstein
5,995,895 A 11/1999 Watt et al.
6,546,705 B1 * 4/2003 Scarlett et al. ........ 56/10.2 R

FOREIGN PATENT DOCUMENTS

EP 0 576 121 * 12/1993
EP 576121 12/1993
GB 2178934 2/1987

* cited by examiner

*Primary Examiner*—Thu V. Nguyen
(74) *Attorney, Agent, or Firm*—MacMillan, Sobanski & Todd, LLC

(57) ABSTRACT

A method of applying substances to a land begins with inputting data indicative of the substance requirement for the land into a processor. The land is traversed with a vehicle having an engine and a transmission that can vary the vehicle speed without adjusting the engine speed. The vehicle has an appliance including a mechanism for applying the substance to the land. The appliance application rate is input into the processor with the desired engine speed. The land is traversed with the vehicle with the engine speed set at the desired engine speed. The vehicle position is established, and a signal is generated to indicate a requirement for adjustment to the transmission to change the vehicle speed to match the individual section requirement to the appliance application rate. Lastly, the transmission is adjusted according to the signal generated by the processor.

16 Claims, 1 Drawing Sheet

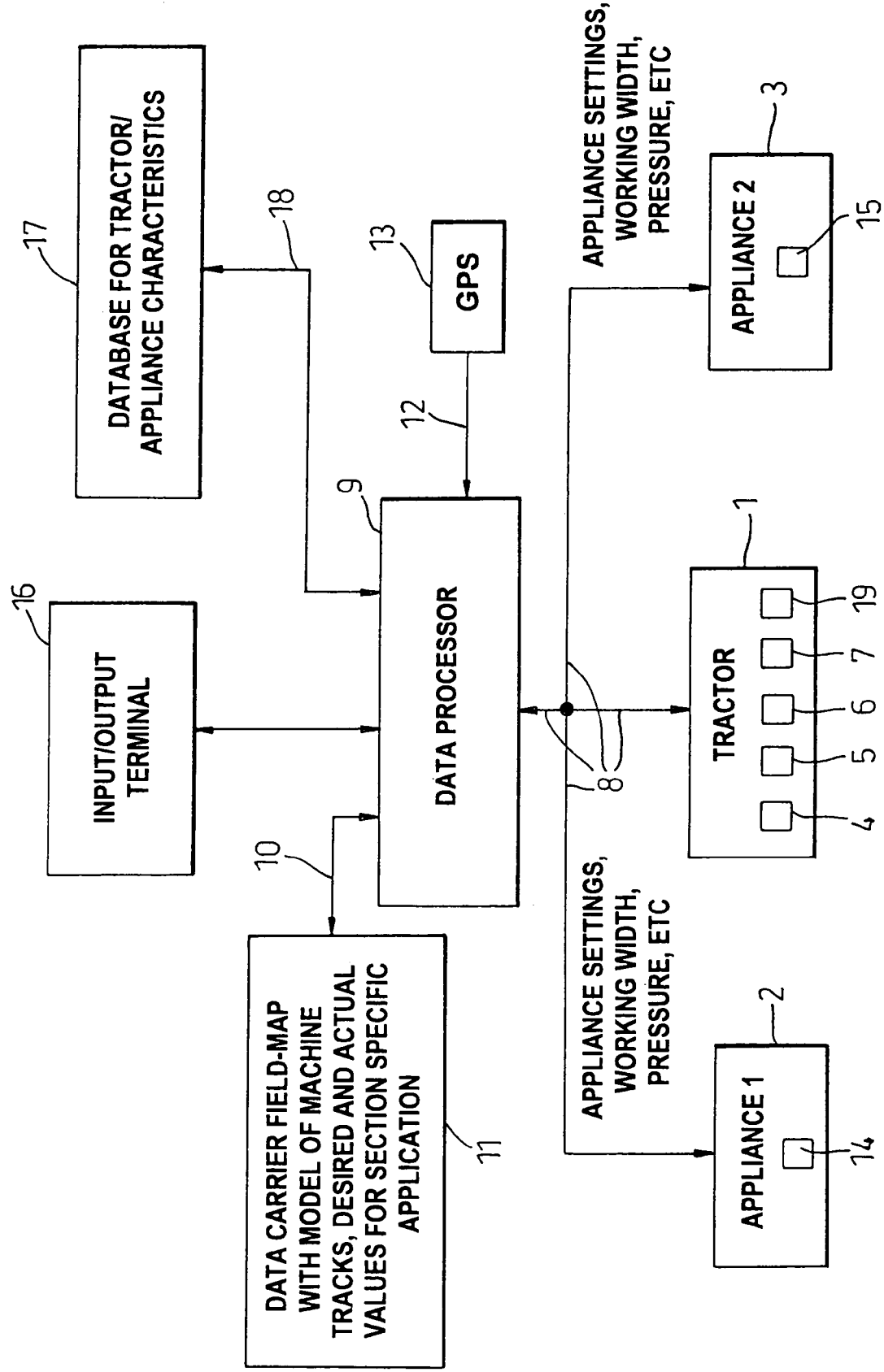

APPARATUS AND METHOD FOR THE VARIABLE RATE APPLICATION OF SUBSTANCES TO LAND

BACKGROUND OF THE INVENTION

The invention concerns the application of substances such as fertilizers, minerals, and/or pesticides according to the specific requirement of an individual section of an area of land in agricultural use.

By making the land application treatment specific to individual sections of land the application rate of fertilizer and pesticides can be automatically adjusted to fit the requirement of the respective section. The following equipment is necessary in order to carry out a section-specific application treatment:

(1) appliances with an electronic control system to adjust the application rate to correspond to a desired value taken from a field map and which depends on the speed of travel and the position in the field operation;
(2) harvesting equipment with devices for recording the local crop yield;
(3) input/output unit (terminal) for the application treatment;
(4) data carrier with desired data for the application treatment and for recording the actual application rate data with corresponding positional association;
(5) navigation equipment (as a rule GPS or DGPS) to determine the position of the vehicle performing the operation;
(6) electronic control system on the tractor for recording and transmitting basic information such as, for example, speed of travel, slippage, engine speed, rpm of power take-off shaft, etc.;
(7) stationary data processing by PC for the application treatment—drawing up the field map of the desired values for the application rate of the substance to be spread; and
(8) additional equipment for determining the local supply of nutrients in the soil, recording the local stock of plants, local climate of the atmosphere and the soil.

A similar system, in which the electronic controls are connected via a data bus, has been implemented and is already widely available. Known developments point in the direction of adapting the appliance for applying the substances in a manner specific to individual sections of land. As a rule, a specific speed of travel is set for the process, and the application rate is adjusted with the automated control instruments on the appliances according to the speed of travel and the setting established from the application treatment record.

Under these conditions, very costly technology is necessary on each piece of equipment involved in this chain. The extent of the expenditure required can be seen for example from DE 199 43 561 A1, according to which each piece of equipment is provided with final control elements according to its function, with numerous sensors for monitoring the final control elements and with an allocated job calculator. Furthermore as a result of this procedure, when liquid fertilizers or pesticides, for example, are being spread, either only certain methods are possible or else the application no longer meets the actual requirement. Thus, on vehicles for applying liquid manure which have "rebounding plates," the working width is dependent on the pressure. However, to alter the application rate using the pressure, then inevitably the working width and the accuracy of distribution over the working width will fluctuate. When spraying with pesticides, the application rate is likewise controlled by means of the pressure. However, the distribution of the droplet spectrum alters with the pressure. High pressure results in a higher application rate, but also in a droplet spectrum with very fine drops, so that increased drift and application to the plant stock in deeper layers is no longer possible. Lower pressure results in a lower application rate, but also to a droplet spectrum with large drops and the application to the plants is therefore of inferior quality.

This disadvantage also occurs with fertilizer and lime spreaders driven by a power take-off shaft. Here, the engine speed must be kept constant so that the scatter diagram matches the desired distribution. The application rate is adjusted using a control device on the dosing instrument. At the same time, the equipment compensates for factors influencing the speed of travel, for example slippage.

When spreading liquid manure conventional distribution equipment must be abandoned and correspondingly costly precision distributors provided, so that the distribution over the working width can be independent of the pressure.

SUMMARY OF THE INVENTION

The invention sets out to design a more economical system for the application of substances of the type described above, in which better use is made of the given resources on the vehicle.

One solution to this problem is, when the application rate of the appliance is constant in time over at least one section of the entire distance traveled, to make the speed of travel of the tractor continuously variable so that the substance being spread is distributed onto the section of land currently undergoing treatment according to its specific substance requirement based on signals from the data processing system. In this way, a lower specific substance requirement in one section of land brings about a higher speed of travel and a higher specific substance requirement in another section of land brings about a lower speed of travel.

The use of vehicles with continuously adjustable drives, thus allowing any speed of travel at a constant engine speed, creates a further possibility for adapting the application rate specific to individual sections. The application rate for the particular section can be varied by altering the speed of travel and at the same time the time-related application rate of the appliances can be held constant for optimum results from the point of view of the process technology. The use of sensors and calculators attached to the equipment is thus rendered unnecessary, so that vehicles of this type with automatically controlled, technically undemanding equipment and even with older, manually operated equipment, can be operated.

This invention relates to an apparatus for and method of applying substances to an individual section of an area of land according to the specific requirement of the individual section. Initially, data indicative of the specific substance requirement for individual sections of the area of land is read from an electronic map and inputting said data into a data processor. The area of land is traversed with a vehicle having an engine and a transmission, the transmission including means for varying the speed of the vehicle without adjustment of the engine speed, sensors for establishing the speed of the vehicle, the position of the vehicle, and the drive ratio of the transmission, the vehicle having attached thereto an at least one appliance comprising an application mechanism for application of the substance to the area, which mechanism is driven by the vehicle. The application rate of the or each appliance is input into the data processor. The desired engine speed is input into the data processor. The area of land is traversed with the vehicle with the engine speed set at the desired engine speed. The position of the vehicle is established, and a signal is generated to indicate a requirement for adjustment to the transmission to increase or decrease the speed of the vehicle to match the individual section requirement to the application rate of the appliance. Lastly, the transmission is adjusted according to the signal generated by the data processor.

Various objects and advantages of this invention will become apparent to those skilled in the art from the following detailed description of the preferred embodiment, when read in light of the accompanying drawing.

BRIEF DESCRIPTION OF THE DRAWING

The sole FIGURE in the application is a block diagram of the elements required for the application of substances over an area of agricultural land in accordance with this invention.

DETAILED DESCRIPTION OF THE PREFERRED EMBODIMENT

Referring now to the drawing, there is illustrated an agricultural tractor indicated by 1 on the block diagram that carries two fertilizer spreaders, appliances 2 and 3, which are, for example, mounted on the front and the rear of the tractor. The tractor 1 is equipped with sensors 4, 5, 6, and 7 as a minimum, and these determine the actual values of the current speed of travel, the engine speed, and the rpm of the power take-off shaft. The signals from the sensors 4, 5, 6, and 7 are issued to a data bus 8. The data bus 8 establishes a connection between the data processor 9, the tractor 1, and appliances 2 and 3. Consequently, the actual values from the tractor 1 are also available to appliances 2 and 3. The data processor 9 is linked via a connection 10 to a data carrier 11 containing a field map and via a connection 12 to a GPS device 13 that reproduces the exact position of the vehicle. The field map contains details of the section-specific fertilizer requirement as established in a previous spreading operation as well as the desired machine tracks (setting advising on which track the tractor 1 should be driven).

In this version, the appliances 2 and 3 are automatic appliances. This means that their adjustment mechanism for the quantity of substances to be applied has final control elements 14, 15, that can be adjusted by remote control, are controllable, and which can be set to different application rates during one application run. The final control elements 14, 15 receive the application rate desired values from the data processor 9 via the data bus 8. In another version, the final control elements 14, 15 can be manually adjustable only, and for this reason they should be set before starting the operation.

In addition, an input and output terminal 16, which has an electrical connection to the data processor 9, is placed within reach of the tractor driver so that he can enter any further details required to calculate the desired vehicle speed in the data processor 9. These may be details for the identification of the appliances mounted on the tractor 1, which make it possible to gather important data from the database 17 and evaluate it, the data having been obtained on the occasion of earlier spreading operations and saved in the database 17. The database 17 is connected to the data processor 9 via electrical connection 18. Also connected to the data processor 9 via the data bus 8 is a control device 19 for the continuously adjustable transmission of the tractor 1, which is not shown.

The database 17 and the data carrier 11 can be set up, changed, and evaluated on a stationary data processing unit (PC), which is not shown on the drawing. There is also the facility to take into consideration additional conditions for crop growing and other significant data.

The task of treating a given section of agricultural land with fertilizer is carried out as follows. The following information is entered on the terminal 16 for the appliances 2 and 3 that are to be used:

(1) the appliance parameters, including the information on whether they are fitted with automatic adjustment or not, and (2) a typical maximum vehicle speed for the planned operation taking into consideration the conditions of the terrain and the vehicle's upper limit.

For appliances 2, 3 without automatic adjustment, the optimum setting for their spreading mechanism (e.g. size of nozzles) is determined for the entire field on the basis of the maximum speed of travel and the smallest section-specific fertilizer requirement. For appliances 2, 3 with automatic adjustment, the desired value for the speed of travel is set according to the maximum work output, as long as the appliance is working within the range considered good from the process technology point of view. Thus, the time-related application rate of the appliance 2, 3 is adjusted to the actual speed of travel. The time-related application rate is also adjusted when the vehicle's upper limit is reached and a lower speed of travel is set. As soon as the appliance 2, 3 reaches the limit of the favorable process technology range, the speed of the vehicle is adjusted according to the appliance's time-related rate of application, so that the rate of application neither falls below nor exceeds the level specific to that section of land. This can happen if the minimum section-specific requirement is only taken for one machine track at a time on the field map and the minimum section-specific requirement for a machine track falls below that of the preceding one. If this is the case, then a new optimum setting for the spreading mechanism and the speed of travel is determined on the basis of the current minimum section-specific requirement.

The application rate of the appliance 2, 3 may be entered into the data processor 9 via a manual input, or electronically from the appliance 2, 3, for example via the implement and tractor CAN bus.

The desired speed of travel depending on the section-specific fertilizer requirement at the position of the vehicle is determined according to the following relationship:

desired speed of travel [m/s]=appliance application rate [kg/s]/(section-specific requirement [kg/m$^2$]*working width of appliance [m])

using the data processor 9, where in the ideal case, with the desired speed of travel being maintained exactly, the section-specific application rate corresponds to the section-specific requirement. A signal corresponding to the desired speed of travel is sent by the data processor 9 to the control device 19 for conversion.

The most suitable type of transmission for the performance of the invention is a continuously variable transmission, because such a transmission provides for substantially exact matching of the forward speed of the vehicle to the desired forward speed. However, close matching of forward speed of the vehicle to the desired forward speed may also be achieved using a transmission having a plurality of discrete ratios, for example, a synchro-mesh transmission, a power-shift transmission, or a transmission combining both synchro-mesh and power-shift elements.

The invention may work with such transmissions having discrete ratios in the following manner. As the vehicle traverses the field, the data processor 9 calculates the desired forward speed of the vehicle. The transmission monitor monitors the engaged ratio of the transmission. If, with constant engine speed, the engaged ratio does not provide the forward speed which is the closest to the desired forward speed which may be provided by any of the ratios, the data processor 9 generates a signal indicating the ratio which must be selected. Selection of the new ratio may be automatic, the signal being sent from the data processor 9 to a transmission controller, which effects the change, or manual, in which case a display is provided on which the requirement for a ratio change is indicated graphically to the driver. The driver may be told which ratio to select, or he may be simply told to upshift or downshift.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of applying substances to an individual section of an area of land according to the specific requirement of the individual section comprising the steps of:
   (a) reading data indicative of the specific substance requirement for individual sections of the area of land from an electronic map and inputting said data into a data processor;
   (b) traversing the area with a vehicle having an engine that drives a transmission, the transmission including means for varying the speed of the vehicle without adjustment of the engine speed, sensors for establishing the speed of the vehicle, the position of the vehicle, and the drive ratio of the transmission, the vehicle having attached thereto at least one appliance comprising an application mechanism for application of the substance to the area, which mechanism is driven by the vehicle;
   (c) inputting the application rate of the or each appliance into the data processor;
   (d) inputting a desired constant engine speed into the data processor;
   (e) traversing the area with the vehicle with the engine speed set at the desired engine speed;
   (f) establishing the position of the vehicle;
   (g) generating a signal to indicate a requirement for adjustment to the transmission to increase or decrease the speed of the vehicle to match the individual section requirement to the application rate of the appliance at the desired constant engine speed; and
   (h) adjusting the transmission according to the signal generated by the data processor.

2. The method defined in claim 1 wherein the data processor is linked to a display, and upon receipt of a signal indicating a requirement to adjust the transmission by the data processor, the data processor sends a signal to the display, and the display shows graphically the requirement to adjust the transmission.

3. The method defined in claim 1 wherein the transmission comprises a continuously variable drive.

4. The method defined in claim 3 wherein the drive ratio of the continuously variable drive is adjusted by a control means linked to the data processor upon receipt of a signal from the data processor indicating a requirement for adjustment to the drive ratio.

5. The method defined in claim 1 wherein the transmission comprises a drive including a plurality of discrete ratios.

6. The method defined in claim 5 wherein upon the display of a signal to adjust the drive ratio of the transmission, the operator of the vehicle executes the adjustment indicated on the display.

7. The method defined in claim 5 wherein the transmission comprises automatic selection means and a transmission controller, and wherein selection of the drive ratio is effected automatically upon receipt by the transmission controller of a signal from the data processor to change the drive ratio, and wherein the drive ratio selected is the drive ratio which causes the vehicle to travel with a forward speed as close as possible to the desired speed, with the engine speed remaining constant.

8. An apparatus comprising
   a data processor;
   an electronic map;
   a vehicle having an engine that drives a transmission, the transmission including means for varying the speed of the vehicle at a constant engine speed, sensors for establishing the speed of the vehicle, the position of the vehicle, and the drive ratio of the transmission, the vehicle having attached thereto at least one appliance comprising an application mechanism for application of the substance to the area, which mechanism is driven by the vehicle; and
   application rate input means for inputting the application rate of the or each appliance into the data processor;
   wherein the data processor receives inputs from the vehicle location means, the electronic map, the vehicle function sensors, and the application rate input means, and
   wherein the data processor calculates the vehicle forward speed required to deliver the appropriate amount of substance to an individual section of the area, and compares the current drive ratio with the drive ratio required to propel the vehicle at the desired forward speed while maintaining the constant engine speed, and wherein if a change to the drive ratio is required to deliver the desired forward speed, the data processor generates a signal to initiate the said change.

9. The apparatus defined in claim 8 further comprising a display connected to the data processor, wherein upon receipt of a signal from the data processor indicating a requirement to adjust the transmission, the display shows graphically the requirement to adjust the transmission.

10. The apparatus defined in claim 8 wherein the transmission comprises a continuously variable drive.

11. The apparatus defined in claim 10 further comprising control means linked to the data processor, said control means being responsive to a signal from the data processor to adjust the drive ratio.

12. The apparatus defined in claim 8 wherein the transmission comprises a drive including a plurality of discrete ratios.

13. The apparatus defined in claim 12 wherein upon display of a signal to adjust the drive ratio of the transmission, the operator of the vehicle executes the adjustment indicated on the display.

14. The apparatus defined in claim 12 wherein the transmission comprises automatic selection means and a transmission controller, and wherein selection of the drive ratio is effected automatically upon receipt byte transmission controller of a signal from the data processor to change the drive ratio, and wherein the drive ratio selected is the drive ratio which causes the vehicle to travel with a forward speed as close as possible to the desired speed, with the engine speed remaining constant.

15. The apparatus defined in claim 8 wherein the application rate input means comprises a manual input.

16. The apparatus defined in claim 8 wherein the application rate input means comprises an electronic input from the appliance to the data processor.

* * * * *

UNITED STATES PATENT AND TRADEMARK OFFICE
CERTIFICATE OF CORRECTION

PATENT NO.        : 7,142,966 B2                                    Page 1 of 1
APPLICATION NO. : 10/176393
DATED             : November 28, 2006
INVENTOR(S)       : Michael Saller et al.

It is certified that error appears in the above-identified patent and that said Letters Patent is hereby corrected as shown below:

Column 6, Claim 14, line 65, after "receipt", change "byte" to -- by the --.

Signed and Sealed this

Thirteenth Day of February, 2007

JON W. DUDAS
*Director of the United States Patent and Trademark Office*